July 12, 1966 G. A. KUPSKY 3,260,880

ELECTRO-OPTICAL INDICATOR DEVICES WITH MULTIPLE ANODES FOR EACH CELL

Filed June 6, 1961 5 Sheets-Sheet 1

INVENTOR.
GEORGE A. KUPSKY.
BY Robert A. Green
ATTORNEY

INVENTOR.
GEORGE A. KUPSKY.
BY Robert A. Green
ATTORNEY

INVENTOR.
GEORGE A. KUPSKY.
BY Robert A. Green
ATTORNEY

INVENTOR.
GEORGE A. KUPSKY.
BY Robert A. Green
ATTORNEY

INVENTOR.
GEORGE A. KUPSKY
BY Robert A. Green
ATTORNEY

United States Patent Office 3,260,880
Patented July 12, 1966

3,260,880

ELECTRO-OPTICAL INDICATOR DEVICES WITH MULTIPLE ANODES FOR EACH CELL

George A. Kupsky, Plainfield, N.J., assignor to Burroughs Corporation, Detroit, Mich., a corporation of Michigan
Filed June 6, 1961, Ser. No. 115,128
31 Claims. (Cl. 313—109.5)

This invention relates to electro-optical indicator devices and to a new construction therefor.

There are many types of electro-optical indicator devices presently available, and one is a cold cathode gas tube which includes a stack of cathode electrodes, each of which is adapted to exhibit cathode glow. Tubes of this type, which are described generally in U.S. Patents No. 2,874,320 and No. 2,878,407, have proved eminently successful. However, these tubes embody certain constructional features which raise problems for the manufacturer. For example, since the cathode electrodes are arranged in a stack and each must be clearly viewable, precautions must be taken to prevent the cathodes at the top of the stack from obstructing the other cathodes near the bottom of the stack.

Another type of known indicator device is known as a matrix device, and includes a plurality of co-planar light-producing elements which are connected in different combinations, each providing a different character representation. The light-producing or glow elements may be cold cathodes, hot cathodes, neon bulbs, electroluminescent elements, or the like. Perhaps the most serious limitation in devices of this type is that undesirably complex external coding circuitry, multiple contact switches, or the like are required to provide the desired combinations of glow elements.

The objects of the present invention are directed toward the provision of an improved electro-optical indicator device and particularly an improved matrix-type indicator device which is compact and relatively simple in construction and operation.

Briefly, an indicator device embodying the invention includes a matrix of separate and distinct elements, each of which includes light-producing means. The device also includes a plurality of energizing or actuating means associated with, and adapted to operate, each of said light-producing elements. The actuating means are connected in different combinations within the device, each combination being adapted to energize a different combination of glow elements, each combination of glow elements being adapted to represent a different character.

The invention is described in greater detail by reference to the drawings wherein.

The principles of the present invention have many applications, and they may be employed with different types of light-producing electro-optical elements including both cold cathodes and electroluminescent elements. The invention is first described as it applies to cold cathode gaseous devices.

Figure 1:
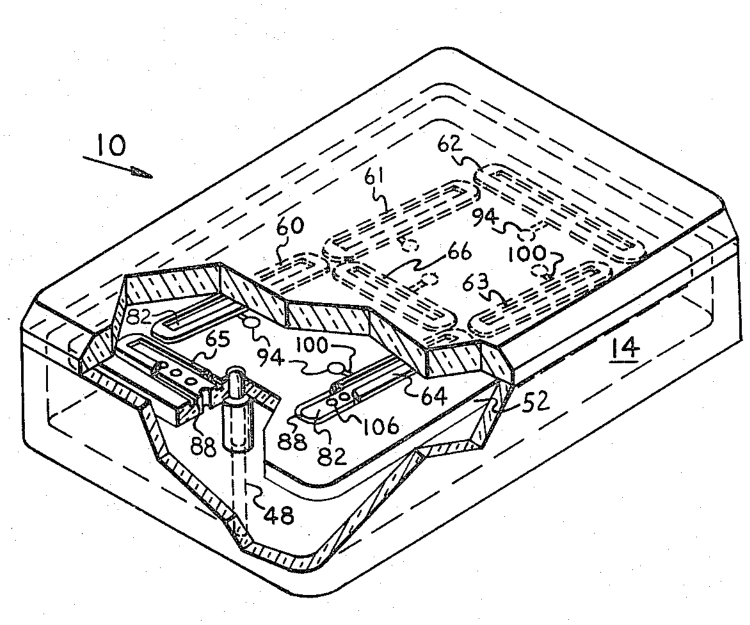
FIG. 1 is a perspective view, partly in section, of one embodiment of the invention.
Figure 3:
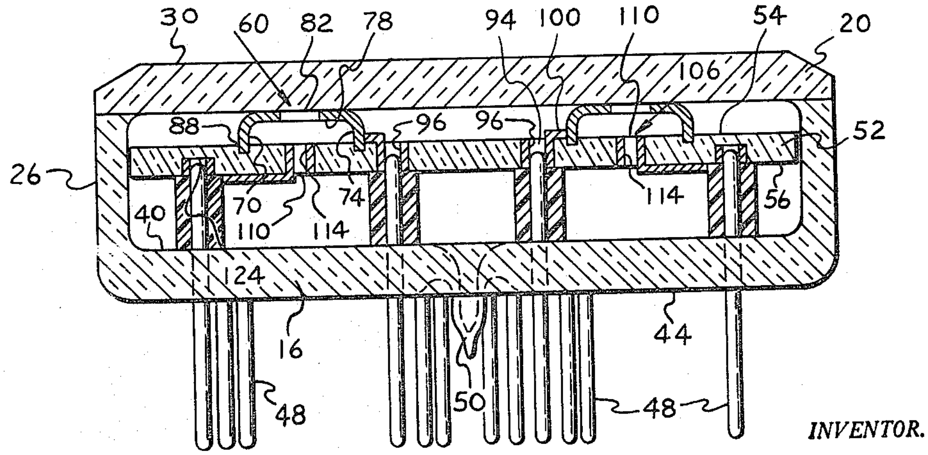
FIG. 3 is a sectional view of the device shown in FIG. 1.
Figure 2:
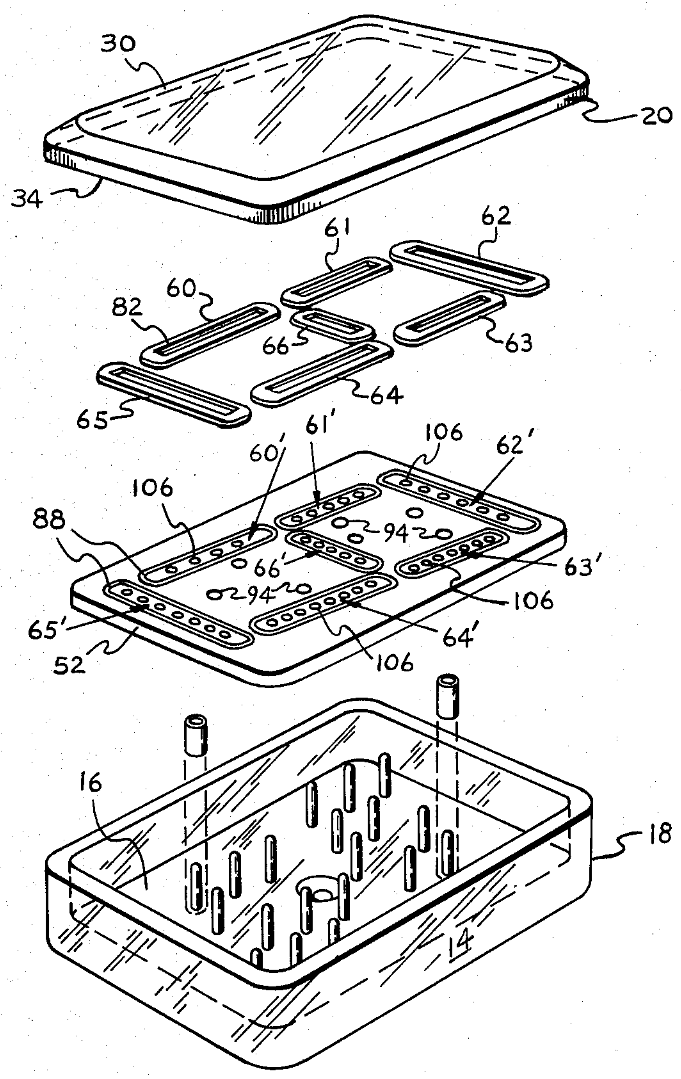
FIG. 2 is an exploded view of the device shown in FIG. 1.

Referring to FIGS. 1, 2, and 3, an indicator tube 10, embodying the invention, includes a generally cup-shaped stem 14 having a base 16 and a side wall 18, and a face plate 20 which is hermetically sealed to the side wall of the stem. The face plate 20 includes top and bottom surfaces 30 and 34 and is translucent, so that light generated in the interior of the tube may be viewed from the outside. The stem 14 is of insulating material and its base includes top and bottom surfaces 40 and 44, respectively, and carries the usual conductive pins 48 and a conventional tubulation 50, by means of which the tube may be exhausted and filled with gas. The tube 10 may have any suitable configuration, for example, it may be circular, rectangular, or the like.

The electrode assembly of the tube 10 is in matrix form and includes a plurality of groups of cathode-anode assemblies which are adapted to be combined in different ways to provide a plurality of different light-producing character representations. The particular form of the invention described is adapted to indicate numerals zero to nine. Other arrangements might be made to provide representations of other characters.

The cathode elements of the tube 10 are elongated members which are positioned between the face plate and another insulating member 52, known as the anode disk, which is described in greater detail below. The number of cathode elements is determined by the characters to be represented, and seven separate distinct cathode elements 60, 61, 62, 63, 64, 65, 66 may be used as shown to represent the numerals zero through nine. If letters or other numerals are to be represented, then other cathode arrangements are used. Such other arrangements will be obvious to those skilled in the art.

In the tube 10, the cathodes are set out generally in the form of a figure eight, with cathodes 60 and 61 spaced apart but axially aligned and cathodes 63 and 64 spaced apart but axially aligned parallel to cathodes 60 and 61. Cathodes 62, 65, and 66 are all parallel to each other and are substantially transverse to the other cathodes, with cathodes 62 and 65 at the top and bottom of the figure eight and cathode 66 at the center of the figure eight. All of the cathode elements are distinct and separate from each other and are adapted to be separately energized.

The cathode glow electrodes, in one construction, are narrow, elongated metallic members having a generally U-shaped cross-section. Since the cathodes are substantially identical, only the parts of one cathode 60 are described in detail. Referring to FIG. 3, cathode 60 includes legs 70 and 74 and a base 78, the base having an aperture or slit 82 along substantially its entire length. In the operating tube, cathode glow is visible through the slit 82, and the width of the cathode between legs 70 and 74 and the width of the slit 82 are designed to provide optimum glow and optimum cathode function. The optimum arrangement takes advantage of the hollow cathode effect and utilizes a slit 82 which is about one-fourth as wide as the distance between the legs 70 and 74.

The cathode members 60 and 66 all lie in the same stratum in tube 10 and are positioned between the face plate 20 and the anode disk 52, with the base 78 of each cathode in contact with the lower surface 34 of the face plate 20 and the end of the leg portions in contact with the top surface 54 of the anode disk 52. Preferably, the leg portions lie in a suitable depression 88 formed in the surface of the anode disk. From the foregoing description, it can be seen that each cathode encompasses and overlies a distinct portion of the surface 54 of the anode disk, the distinct portion having the same size and shape as the cathode element itself. The contact of each cathode element with the face plate 20 and with the anode disk 52 should be intimate and, preferably, gas-tight so that, in effect, the interior of each cathode element defines a separate isolated channel of gas between the anode disk and the face plate. Effective isolation of the cathodes can then be achieved in operation of the tube. When the tube is completed and the envelope is filled with gas, the gas fills each of the channels between the face plate 20 and anode disk 52 defined by the cathode elements, and it is this gas within each cathode element which glows.

Electrical connections are made to the cathodes through apertures 94 formed in the anode disk, one aperture being provided for each cathode. Each aperture is coated with conductive material 96 (FIG. 3), and a suitable conductive line or lead 100 extends from each cathode to an aperture. Tube pins 48 carried by the stem extend into the apertures 94 in the anode disk and, thereby, make electrical contact with the cathodes. If desired, auxiliary contact-making members (not shown) may be provided on the pins to insure good contact with the aperture lining. The apertures 94 may be positioned in any convenient locations in the anode disk so long as they do not interfere with the anode elements to be described. Insulating spacers of ceramic or the like are provided on the pins 48 to provide a supporting base for the anode disk 52 and to cover the pins and prevent them from glowing.

In a matrix-type tube such as tube 10, the cathodes are used in different combinations to provide the various desired numeral representations. Thus, for example, the cathodes 60 and 61 or 63 and 64 are used to represent numeral one, cathodes 62, 63, 66, 60, and 65 are used to represent numeral two, cathodes 62, 63, 66, 64, and 65 are used to represent numeral three, and so forth.

According to the invention, the tube anodes are used as the switching means for causing a selected cathode element or group of elements to glow and provide the desired character representation, and, since each cathode is used more than once and in different combinations, a plurality of groups of anode elements are provided, with one group being associated with each cathode, and with a separate anode element being provided in each group for each time the associated cathode is used in a particular combination.

Referring to FIG. 2 and the anode disk 52, the anode electrodes 106 are provided in groups, 60′, 61′, 62′, 63′, 64′, 65′, and 66′, with one group of anodes being provided for, and associated with, each cathode electrode. Thus, if cathode element 60 is used in making up four numerals, then four anodes 106 are provided in group 60′ associated with the cathode 60. Similarly, if cathode element 62 is used in making up eight numerals, then eight anodes 106 are provided in group 62′ associated with cathode 62, etc.

The anodes 106 also all lie in the same stratum or plane within the tube 10. In this embodiment of the invention, each anode is associated with an aperture 110 which extends through the anode disk 52 from the top surface to the bottom surface, and each anode electrode comprises a conductive film or coating 114 on the wall of each aperture and extending along the entire depth of the aperture.

According to the invention, the various anode elements 106 are interconnected or programmed within the tube so that one anode assembly, comprising one or more anode elements, is provided for each character to be represented, and each anode assembly is adapted to be operated by the application of a single potential to a single tube pin. Thus, assuming, for example, that cathodes 63 and 64 are used to represent numeral one, then one anode element in group 63′ is connected to one anode element in group 64′ in a manner described below. Similarly, assuming that cathodes 62, 63, and 64 are used to represent numeral seven, then one anode element in each group of anode elements 62′, 63′ and 64′ is connected in a group for use in producing a glowing numeral seven. Thus, the anodes are connected in ten different groups to provide representation of numerals zero to nine.

Figure 4:
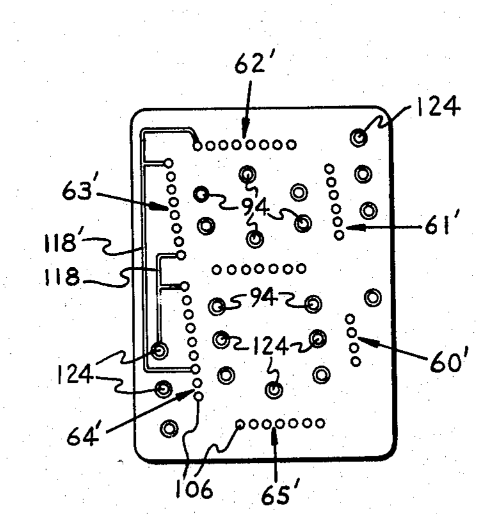
FIG. 4 is a plan view of the bottom surface of the anode disk of the device shown in FIG. 1.

Preferably, the anode elements are connected together by means of conductive leads formed on the bottom surface 56 of the anode disk 52. Thus, referring to FIG. 4, a lead 118 interconnects anodes from group 63′ and 64′ for numeral one, and a lead 118′ interconnects anodes from groups 62′, 63′, and 64′ for numeral seven. The other eight groupings of anodes are made in similar fashion. Each lead 118 and 18′ extends to a depression 124 (FIGS. 3 and 4) which is formed in the bottom surface of the anode disk and which is lined with conductive material to make electrical contact with a pin 48.

If desired, the anode-connecting leads 118 may all be formed on the top surface 54 of the anode disk (FIG. 2), or, for convenience, some may be formed on the top surface, and some may be formed on the bottom surface. In addition, if desired, the anode apertures 110 may be used to receive contact pins 48, rather than depressions 124.

Figure 5:
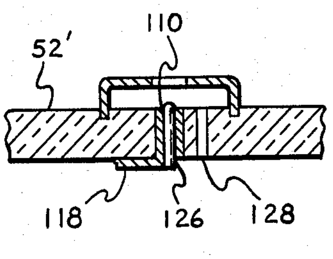
FIG. 5 is a sectional view of a portion of a modification of the device of FIG. 1.

Many modifications may be made in tube 10 within the scope of the invention. First, with respect to the anode disk, a modified disk 52′ shown in FIG. 5 is identical to disk 52, except that each anode aperture 110 carries a conductive pin 126 in place of the conductive layer 114. Electrical connections may be made as described above. In this case, each area of the anode disk enclosed by a cathode element is provided with at least one auxiliary aperture 128 by which gas may be admitted to the channel enclosed by the cathode.

Figure 6:
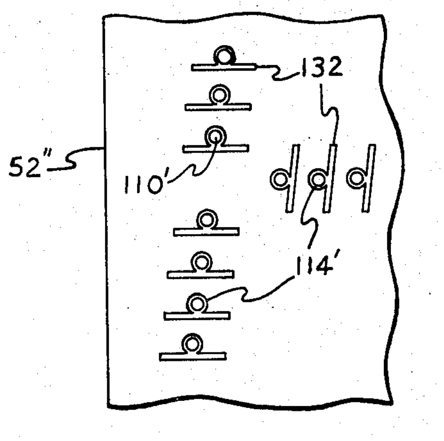
FIG. 6 is a plan view of a portion of a modification of the anode disk shown in FIG. 1.
Figure 7:
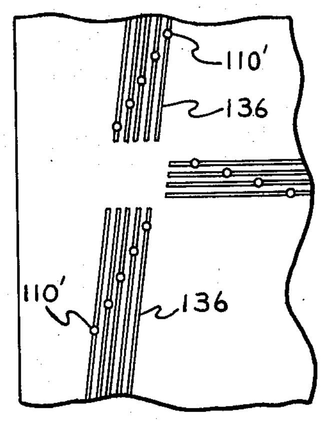
FIG. 7 is a plan view of a portion of a modification of the anode disk shown in FIG. 1.

Another modified disk 52″, a portion of which is shown in FIG. 6, includes anode elements which comprise short conductive lines 132, oriented parallel to each other and transverse to the axis of each cathode electrode. Each anode element 132 is electrically connected, for example, to its own conductive aperture 110′. Another modified disk 52‴, a portion of which is shown in FIG. 7, includes anode elements which comprise conductive lines 136 oriented parallel to each other and to the axis of the associated cathode element. In such a construction, a favorably large operating anode surface is provided. In both FIG. 6 and FIG. 7, each group of anode lines lies completely within the area enclosed by its associated cathode element.

Each of the modified anode disks described above may be substituted directly in the tube 10 for the anode disk 52.

Figure 8:
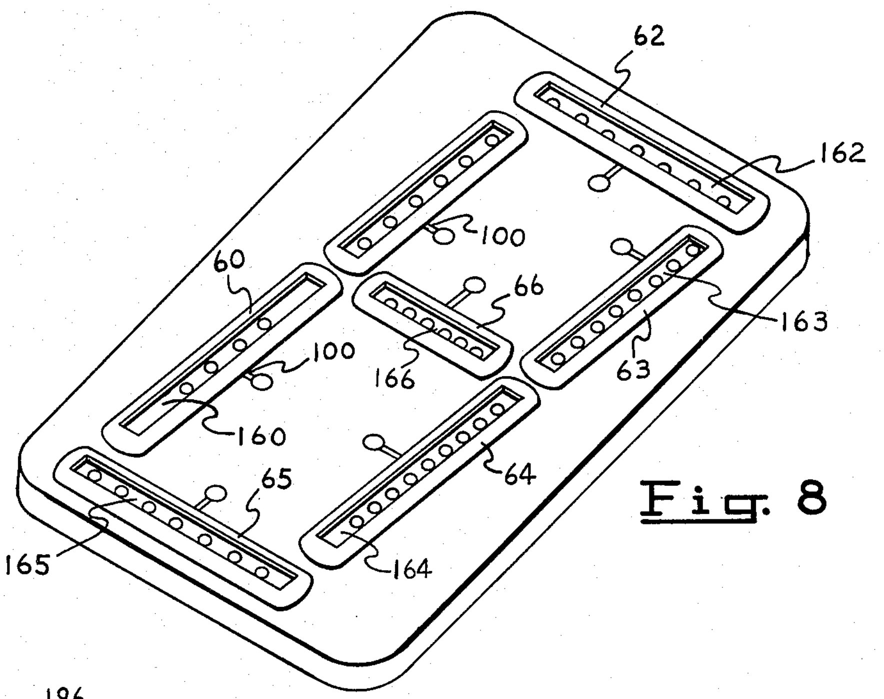
FIG. 8 is a perspective view, partly in section, of a modification of the cathode arrangement shown in FIG. 1.

The cathode portion of the invention may also be modified in many ways, and, in all of the following modifications thereof, an insulating cathode disk, comparable to the anode disk 52, is used. One cathode disk 140 shown in FIG. 8 is built around the cathode elements 60 to 66 and comprises a body of insulating material having channels 160, 161, 162, 163, 164, 165, and 166 of a size and shape suitable to receive each of the cathode elements. Lead connections 100 to the cathodes may be made as described above. Such a cathode disk, when combined with the other elements of the tube 10, provides a compact and strong assembly electrode.

Figures 9, 10:
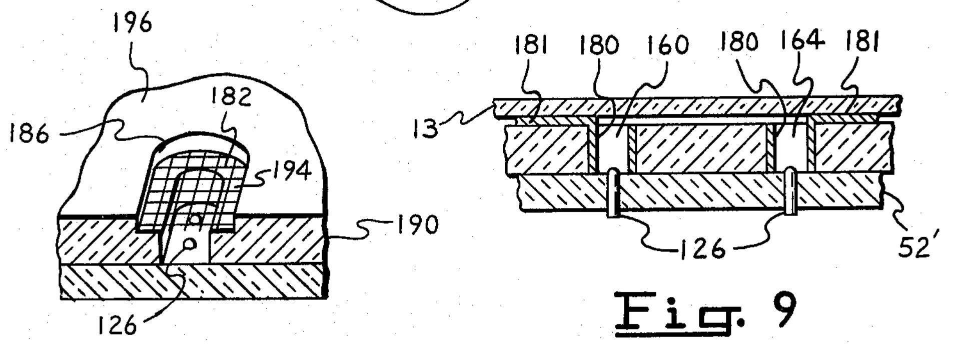
FIG. 9 is a sectional view of a portion of a modification of the device of FIG. 1.
FIG. 10 is a perspective view, partly in section, of a modification of the cathode portion of the invention.

A modified cathode disk shown in FIG. 9, includes the channels 160 to 166, with the cathodes being provided as layers 180 of metallic material lining the wall of each channel. The conductive coatings 180 may be painted, sprayed, or otherwise applied to the walls of the cathode channels. The conductive coatings 180 may extend from the top to, or near to, the bottom of each channel, with the lower portion of each cathode coating being suitably spaced from, and thus insulated from, each anode element on the surface of disk 50. Electrical connections 181 to the cathodes 180 may be made as described above.

Figure 11:
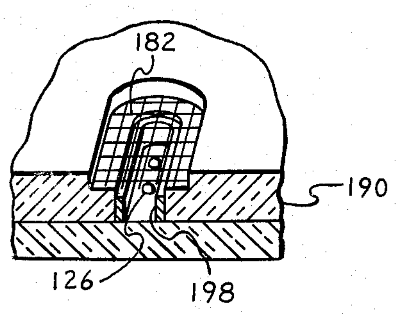
FIG. 11 is a perspective view, partly in section, of a modification of the portion of the invention shown in FIG. 10.

In another modification of the cathode construction, shown in FIG. 10, each cathode comprises a fine mesh screen 182 mounted at the top of a channel 186 in a cathode disk 190. The screen may be secured in the channel in any suitable fashion, for example, on a ledge 194 formed in the top surface 196 of the disk near the top of a channel. If desired, a cathode coating 198 may also be provided on the wall of the channel as shown in FIG. 11, and in this case, the coating 198 is preferably spaced from the screen 182 so that the screen is not electrically connected to the cathode. Such a screen can act as a trap for cathode metal which sputters from the cathode coating 198.

Figure 12:
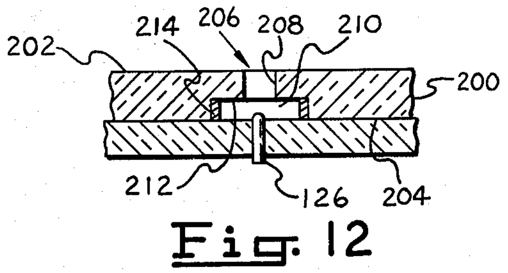
FIG. 12 is a sectional view of a portion of a modification of the invention.

In still another modification of the invention shown in FIG. 12, a cathode disk 200 is employed which has top and bottom surfaces 202 and 204 and is provided with channels 206 having a step form. The step includes a portion 208 of small width extending downwardly from top surface 202 and a portion of greater width extending upwardly from bottom surface 204. Thus, each channel includes a ledge 212 which faces downwardly. In this case, each cathode comprises a metallic insert or coating 214 on the wall of the wider portion 210 of each channel. If cathodes formed in this way are subject to sputtering, the sputtered metal is trapped by the ledge 212 and does not deposit on the face plate of the tube.

Figure 13:
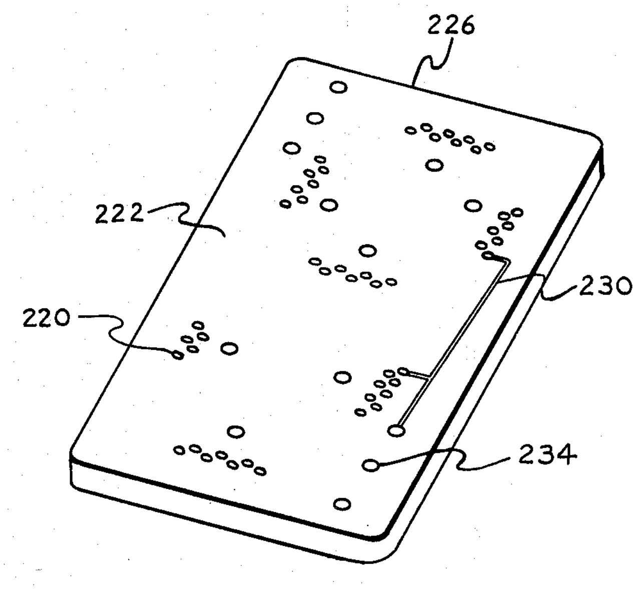
FIG. 13 is a perspective view of a modified anode disk according to the invention.
Figure 14:
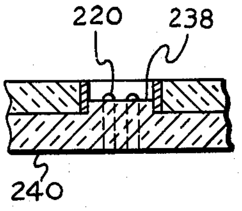
FIG. 14 is a sectional view of a portion of a modified anode disk according to the invention.

The last-mentioned types of cathode disk make it possible to utilize another type of anode construction in addition to those already described. In this modified anode construction shown in FIG. 13, the anode elements comprise dots 220 of conductive material deposited in any suitable manner on the top surface 222 of an anode disk 226. The dot anodes are arrayed in groups as described above, and the programming connections 230 are made on the top surface of the anode disk, as described above, with suitable apertures 234 being provided at suitable locations to facilitate connections to tube pins. The transverse and longitudinal anode lines described above may also be utilized in this type of anode disk. In addition, referring to FIG. 14, anode elements 220 may be mounted on raised portions 238 of anode disk 240, the raised portions extending into the cathode channels. In this construction, the anode elements 220 are preferably associated with apertures which extend through the raised portions of the anode disk.

Figure 15:
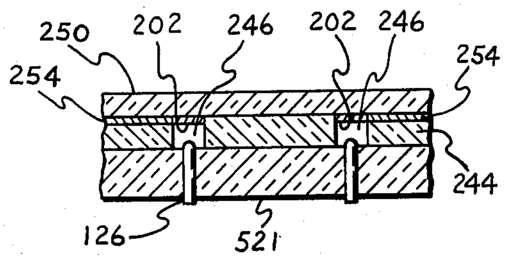
FIG. 15 is a sectional elevational view of a portion of still another modification of the invention.

Another type of cathode construction which may be used in tubes embodying the invention is shown in FIG. 15. Such a modified tube includes anode disk 52′ having anode pins 126 and a cathode disk 244 having channels 246 and leads as shown in FIG. 3. However, no cathode coatings or inserts are provided in the channels in disk 244. In this case, the glow cathodes are formed on the inner surface of face plate 250 as separate coated areas 252 of transparent conductive coating material such as vapor-deposited tin chloride which is known as NESA. One conductive area 252 is provided for each channel, and each area has substantially the same shape and size as the cross-section of the channel with which it is associated. Connecting strips 254 coupled to the cathode areas 252 may be provided on the face plate 250 or on the cathode disk 244.

It has been found to be desirable to isolate each channel from the power supply when it is used in a circuit in order to insure that all channels will glow when they are properly energized. Such isolation is best obtained by means of a resistor coupled between each cathode and the power supply, and these resistors may be provided outside the tube or they may be provided as coatings inside the tube. For example, the conductive strips 100 shown in FIG. 1 might comprise strips of resistive material evaporated, painted, or otherwise formed on the surface of disk 52.

In preparing tube 10 and the various modifications thereof, the tube envelope is evacuated, and the desired gas such as neon or argon is admitted through tubulation 50 to a pressure in the range of about 30 to about 100 mm. of Hg, as measured at room temperature, and then the tubulation is sealed off in conventional fashion. The gas which is admitted to the tube envelope enters the cathode-to-anode spaces through the various apertures provided for this purpose and provides the necessary communication between the anodes at the bottom of a channel and the cathode at the top to sustain cathode glow when proper electrical potentials are applied. Of course, gas pressures outside of the above-mentioned range may also be employed. The gas pressure is selected to provide a desired set of operating conditions, as is well known in the art.

Figure 16:
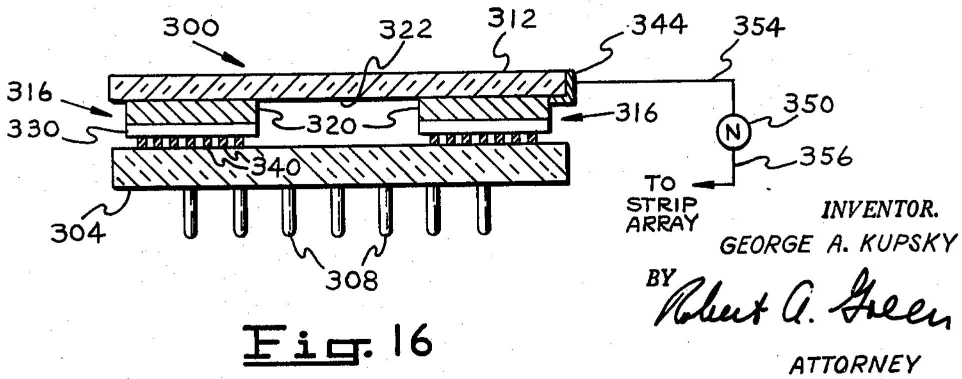
FIG. 16 is a sectional view of a modified device embodying the invention.

The principles of the invention may also be utilized in a device which includes electroluminescent elements as the light-producing means. In this modification of the invention, the same general principles and construction apply as in the cold cathode form of the invention described above. Such a modified indicator device 300 shown in FIGS. 16 and 17 does not require an evacuated or gas-filled envelope and may include in one construction a stem 304 comprising simply a glass plate carrying contact pins 308 and a translucent glass face plate 312, between which the light-producing elements 316 are positioned.

To provide representation of numerals zero to nine in device 300, the same array of seven light-producing elements is provided as in tube 10. Each light-producing element 316 includes a layer 320 of translucent conductive material such as evaporated tin chloride. This layer may be deposited directly on the lower surface 322 of the face plate 312 or on an auxiliary glass plate (not shown). In addition, a separate conductive layer 320 need not be provided for each element, but a single layer may cover the entire face plate and thus be accessible to each element. Each light-producing element also includes a layer 330 of suitable electroluminescent phosphor deposited on the translucent conductive layer. The layers of electroluminescent material all lie in substantially the same stratum or plane, and the material may be any suitable one of many well known electroluminescent phosphors, such as copper-activated zinc sulphide in a suitable carrier such as an epoxy resin. The electroluminescent phosphor may be applied in any suitable manner, for example, by painting, spraying, or the like.

A plurality of conductive activating or switching elements 340, comparable to the anodes in tube 10, are provided on the free surface of the electroluminescent phosphor layer and all lying in the same stratum or plane. Preferably, these switching elements comprise strips of a suitable conductive material, such as silver paint or the like, extending along the length of the element and insulated from each other. This construction is similar to that shown for the anodes in FIG. 7. The conductive strips may be formed in any suitable fashion, for example, by straying through a suitable apertured mask. The stem 304 may conveniently be placed directly in contact with the switching elements. Each light-producing element 316 includes the proper number of switching elements necessary to provide the desired number of character representations as described above with respect to the anode electrodes in tube 10.

In this embodiment of the invention, as in those described above, the switching strips 340 are interconnected or coded by means of conductive lines or leads, just as the individual anodes are interconnected in tube 10. As above, the conductive lines may be formed on the top surface, bottom surface, or both surfaces of the stem 304, with each group of strips being connected to a tube pin 308. The conductive film 320 may be provided with a tab 344 or other suitable terminal which can be connected to a source of energizing potential. In general, an electroluminescent device is operated by means of an A.C. power supply, shown schematically at 350 and having one terminal 354 connected to the conductive film or films 320 and the other terminal 356 adapted to be connected through any suitable switching means to a selected array of switching strips 340.

The present invention provides a multiple character indicator device which has many advantages over similar devices in the prior art. One advantage lies in the small height and compactness which characterize devices of the invention even though relatively large characters may be displayed. Characters having a diameter or length of three or four inches or more may be provided with ease. In addition, the multiple-disk construction of the present invention and the simplicity of the various parts facilitate assembly and make automatic assembly of devices a practicality. Since the matrix elements which make up the display characters may be coded in the device itself, only one tube pin connection is required for each character. Thus, complex external decoding matrices and the like are not required to operate the tube. Also, in the cold cathode form of the invention, since cathode selection is made by applying a signal voltage to the tube anode assembly, a positive energizing signal may be employed.

It has also been found, as an incidental advantage in the cold cathode form of the invention, that both A.C. and D.C. operating potentials may be used satisfactorily. Of course, gas tubes have been operated with A.C. potentials in the past. However, in most indicator tubes, A.C. operation produces undesirable glow of an anode electrode. In tubes embodying the invention, the location of the anodes is such that a viewer sees a desired channel glowing, whether or not the cathode or an anode is responsible for the glow.

One of the most important advantages of the cold cathode embodiment of the invention lies in the fact that, since the cathode elements are compartmented and effectively isolated from each other, the tube has memory; that is, each cathode has a considerably lower sustaining voltage than firing voltage. In addition, in the various forms that the cold cathode form of the invention may take, substantially uniform spacing exists between each operative anode-cathode combination. Thus, the firing potential for each combination is substantially the same, and variations in tube operating characteristics may be effected merely by adjustment of the gas pressure.

In general, when a cathode glows, a viewer observes the relatively narrow edge of the cathode, the relatively greater width of the cathode extending downwardly away from the viewer. Thus, since only a narrow edge and not a large surface has to be covered with current to be viewed, cathode glow is in the normal glow region, current flow is relatively low, and cathode sputtering is similarly relatively low.

Other advantages of the invention will be obvious to those skilled in the art.

What is claimed is:

1. A cold cathode gaseous indicator tube comprising an envelope containing a gas atmosphere suitable for providing cathode glow,
   a plurality of glow cathode elements,
   each element being adapted to display cathode glow by itself,
   a group of anode elements associated with each of said cathode elements,
   selected ones of said anode elements being connected together to constitute a single anode for a selected group of cathode elements which together represent a single character,
   the distance between each of said anode elements and its corresponding cathode element being substantially the same so that the firing potential of each anode-cathode combination is substantially the same.

2. A cold cathode gaseous indicator tube comprising an envelope containing a gas atmosphere suitable for promoting cathode glow,
   a plurality of glow cathode elements each of which is adapted to exhibit cathode glow by itself,
   said cathodes being positioned so that their regions of glow are in substantially the same plane,
   a plurality of separate and discrete anode elements associated with each of said cathode elements,
   said anodes being electrically connected in groups whereby the cathode elements may be energized in groups with each group having a separate character representation,
   each group of anodes having a lead whereby an operating potential may be coupled thereto to cause the corresponding group of cathode elements to glow.

3. A cold cathode gaseous indicator tube comprising an envelope containing a gas atmosphere suitable for displaying cathode glow,
   a plurality of glow cathode elements each of which is adapted to exhibit cathode glow by itself,
   said cathode elements being positioned so that their glow regions lie in substantially the same stratum in said tube,
   a plurality of separate and discrete anode elements arranged in groups with a group of anode elements being associated with each cathode element,
   the anode elements in each group being spaced equidistantly from their associated cathode element,
   each anode having its own lead and being operable to cause a single cathode to glow.

4. A cold cathode gaseous indicator tube comprising an envelope containing a gas atmosphere suitable for supporting cathode glow and including a face plate,
   a first insulating plate within said envelope and having a plurality of channels extending therethrough,
   a cathode glow element positioned in each channel,
   a screen positioned in each channel and lying between the cathode glow element and said face plate,
   a second insulating plate abutting said first insulating plate,
   said second plate carrying a plurality of groups of anode electrodes,
   with the anode electrodes of each group being spaced apart in a substantially co-planar array,
   each group of anode electrodes being aligned with one of the channels in the first insulating plate,
   and means interconnecting selected anode elements to form groups of anode elements with each group of anode elements thus being adapted to energize a selected combination of cathode electrodes having a character representation.

5. A cold cathode gaseous indicator tube comprising an envelope containing a gas atmosphere suitable for supporting cathode glow and including a face plate,
   a first insulating plate within said envelope and having a plurality of channels extending therethrough,
   a cathode glow element positioned in each channel,
   a screen positioned in each channel and lying between the cathode glow element and said face plate,
   each screen being insulated from its associated cathode element,
   a second insulating plate abutting said first insulating plate,
   said second plate carrying a plurality of groups of anode electrodes,
   with the anode electrodes of each group being spaced apart in a substantially co-planar array,
   each group of anode electrodes being aligned with one of the channels in the first insulating plate, and means interconnecting selected anode elements to form groups of anode elements with each group of anode elements thus being adapted to energize a selected combination of cathode electrodes having a character representation.

6. An electrooptical indicator device including
a plurality of light-producing cells lying in substantially a common stratum and adapted to be selectively energized in groups to provide representations of different characters,
each cell including a separate light-producing means and a light-producing medium adjacent to said light-producing means,
and a plurality of separate and discrete actuating means associated with each cell,
each of the separate actuating means associated with one particular light-producing means having an operating portion which is disposed in operative relation with the one particular light-producing means,
the actuating means being electrically connected in different combinations with each combination including one actuating means from each of a plurality of cells,
each combination of actuating means thus being adapted to energize a different combination of light-producing means to provide a plurality of different character representations.

7. The device defined in claim 6 wherein the spacing between the light-producing means and the actuating means is substantially uniform and the same in each operating cell.

8. The device defined in claim 6 wherein each combination of actuating means is coupled to a single terminal whereby a single operating potential may be applied to each of the actuating means in a combination at the same time.

9. The device defined in claim 6 wherein each light-producing means includes a cold cathode gaseous glow element.

10. The device defined in claim 6 wherein the light-producing medium comprises a body of electroluminescent material.

11. The device defined in claim 6 wherein each light-producing means includes a cold cathode gaseous glow element,
all of said last-mentioned elements lying in substantially the same stratum.

12. The device defined in claim 6 wherein each light-producing means includes a cold cathode gaseous glow element,
and each said actuating means comprises an anode electrode.

13. The device defined in claim 6 wherein each light-producing means includes a cold cathode gaseous glow element,
and the said actuating means associated with each cell comprising anode electrodes all lying in substantially the same stratum.

14. The device defined in claim 6 wherein each light-producing means includes an electroluminescent element,
and each distinct operating cell includes a plurality of conductive members in operative relation with an electroluminescent element and adapted to apply operating potential thereto,
said conductive members comprising said actuating means.

15. The device defined in claim 6 wherein each light-producing means includes an electroluminescent element,
and each distinct operating cell includes a plurality of conductive members in operative relation with an electroluminescent element,
said conductive members comprising said actuating means and all lying in substantially the same stratum.

16. A cold cathode gaseous indicator tube comprising an envelope containing a gas atmosphere suitable for supporting cathode glow and including a viewing window,
a first insulating plate within said envelope and having a plurality of channels extending therethrough,
a cathode glow element positioned in each channel,
a second insulating plate abutting said first insulating plate,
said second plate carrying a plurality of groups of anode electrodes,
each group of anode electrodes being aligned with one of the channels in the first insulating plate and the anode electrodes of each such group being spaced equidistantly from its associated cathode,
and means interconnecting selected anode elements to form a plurality of anode selection circuits each being adapted to energize a selected combination of cathode electrodes having a character representation.

17. The tube defined in claim 16 wherein said anode elements comprise metal pins embedded in said second insulating disk.

18. The tube defined in claim 16 wherein said anode elements comprise metallized apertures in said second insulating disk.

19. The tube defined in claim 16 wherein said anode elements comprise conductive lines formed on said second insulating disk.

20. The tube defined in claim 16 wherein said anode elements comprise substantially transverse conductive lines on said second insulating disk.

21. The tube defined in claim 16 wherein said anode elements comprise substantially longitudinal conductive lines on said second insulating disk.

22. An electrooptical indicator device including
a plurality of light-producing cells lying in substantially a common stratum and adapted to be selectively energized in groups to provide representations of different characters,
each cell including a separate light-producing means and a light-producing medium adjacent to said light-producing means,
and a plurality of separate and discrete actuating means associated with each cell,
each of the separate actuating means associated with one particular light-producing means having an operating portion which is disposed in operative relation with the one particular light-producing means,
all of the operative portions of the actuating means associated with one cell and one light-producing means lying in a common plane,
the actuating means being electrically connected in different combinations with each combination including one actuating means from each of a plurality of cells,
each combination of actuating means being adapted to energize a different combination of light-producing means to provide a plurality of different character representations.

23. An electrooptical indicator device of the type having a plurality of separate and distinct light-producing elements which are selectively energizable in predetermined groups to produce patterns of light in the shapes of different characters,
each light-producing element including a first electrode,
a light-producing medium contiguous said first electrode, and a plurality of separate and discrete energizing electrodes spaced from said first electrode and adapted to energize said light-producing medium contiguous said first electrode,
a plurality of electrical conductors each connecting together a plurality of the energizing electrodes associated with different ones of said light-producing elements to form a plurality of distinct electrical selection circuits each adapted to energize a selected combination of said light-producing elements to exhibit a visible character, and
a plurality of terminals respectively connected to different ones of said electrical selection circuits.

24. The device of claim 23 wherein said first electrodes are cathode electrodes and said energizing electrodes are anode electrodes, and wherein said light-producing elements and said electrical conductors are all disposed within an envelope containing an ionizable atmosphere.

25. The device of claim 23 wherein each said first electrode is a glow cathode electrode and further including means substantially isolating the gaseous glow region contiguous each glow cathode electrode from the gaseous glow region contiguous the other cathode electrodes.

26. A cathode glow indicator tube including
an envelope containing a gaseous atmosphere capable of sustaining a glow discharge contiguous a cathode surface,
a plurality of electrode groups within said envelope each including a cathode electrode and a plurality of anode electrodes,
the anode electrodes of each such group being disposed equidistantly from the cathode associated with such group,
and a plurality of electrical conductors within said envelope each connecting together a plurality of the anode electrodes associated with different ones of said cathodes to form a plurality of distinct electrical selection circuits each adapted to energize a selected combination of said cathodes to exhibit a visible character.

27. A cathode glow indicator tube as defined in claim 26 further including a plurality of conductive pins extending through said envelope, each of said pins being connected to one of said electrical conductor selection circuits.

28. A cathode glow indicator tube as defined in claim 26 in which the cathode electrodes are arranged in the shape of a character, so that the selective energization of said circuits causes different character patterns to be displayed.

29. A cathode glow indicator tube including
an envelope having a translucent viewing window and containing a gaseous atmosphere capable of sustaining a cathode glow discharge,
cathode means within said envelope having a plurality of glow regions,
a plurality of anode electrode groups within said envelope each including a plurality of anode electrodes disposed equidistantly from one of said glow regions,
each of said anode electrodes being capable when energized of establishing a cathode glow over the entire area of its associated glow region,
and a plurality of electrical conductors each connecting together a plurality of the anode electrodes associated with different ones of said cathodes to form a plurality of distinct electrical selection circuits each adapted when energized to establish a cathode glow over a selected combination of said cathode glow regions to exhibit a character visible through said translucent viewing window.

30. A cathode glow indicator tube comprising
an envelope containing a gaseous atmosphere capable of sustaining cathode glow and including a viewing window and a base,
a plurality of cathode electrodes each of which is tubular in configuration to form a separate glow chamber within its tubular confines,
said cathode electrodes being held against the viewing window to provide isolation between the different glow chambers,
a plurality of anode electrodes disposed substantially equidistantly from each said cathode electrode and being located within the outline of said tubular cathode,
selected anode electrodes from different ones of said glow chambers being interconnected electrically in separate electrical circuits so that upon energization of said circuits a selected pattern of glow chambers may be actuated.

31. The tube defined in claim 30 wherein the width of said glow cathodes are dimensioned to exhibit the hollow cathode effect.

References Cited by the Examiner

UNITED STATES PATENTS

| | | | |
|---|---|---|---|
| 2,500,929 | 3/1950 | Chilowsky | 315—169 |
| 2,858,480 | 10/1958 | Shadowitz | 315—169 |
| 2,876,385 | 3/1959 | Landrey | 313—109.5 |
| 2,971,109 | 2/1961 | Jackson et al. | 315—169 |
| 2,981,858 | 8/1961 | O'Connell | 313—108.1 |
| 3,008,065 | 11/1961 | Chamberlin | 313—108.1 |

OTHER REFERENCES

"Electroluminescent Display Panel for Cash Register Indication," by Robt. T. Watson, RCA TN 301, November 30, 1959, 313–108.1.

DAVID J. GALVIN, *Primary Examiner.*

RALPH G. NILSON, GEORGE N. WESTBY, *Examiners.*

C. R. CAMPBELL, *Assistant Examiner.*